(12) United States Patent
Smidth

(10) Patent No.: US 6,861,900 B2
(45) Date of Patent: Mar. 1, 2005

(54) FAST TIMING ACQUISITION FOR MULTIPLE RADIO TERMINALS

(75) Inventor: Peter Smidth, Menlo Park, CA (US)

(73) Assignee: Proxim Corporation, Sunnyvale, CA (US)

(*) Notice: Subject to any disclaimer, the term of this patent is extended or adjusted under 35 U.S.C. 154(b) by 452 days.

(21) Appl. No.: 10/034,468

(22) Filed: Dec. 27, 2001

(65) Prior Publication Data

US 2003/0122632 A1 Jul. 3, 2003

(51) Int. Cl.[7] ................................................. H03D 3/00
(52) U.S. Cl. ...................... 329/304; 329/306; 329/307; 375/375; 375/376; 455/192.2; 455/119
(58) Field of Search ................................. 329/304, 306, 329/307; 375/375, 376; 455/192.2, 119

(56) References Cited

U.S. PATENT DOCUMENTS 5,012,491 A * 4/1991 Iwasaki ...................... 375/343
6,236,690 B1   5/2001 Mimura et al.
6,590,942 B1 * 7/2003 Hessel et al. ............... 375/326

* cited by examiner

Primary Examiner—Arnold Kinkead
(74) Attorney, Agent, or Firm—Thelen Reid & Priest LLP

(57) ABSTRACT

A method and apparatus are provided that performs timing acquisition for multiple radio terminals. According to one aspect of the present invention the invention includes receiving a sequence of symbols modulated onto a carrier frequency over a channel and demodulating the symbols using a clock frequency. The invention further includes determining a frequency offset of the received symbols with respect to the clock frequency and applying the determined frequency offset to adjust the clock frequency.

20 Claims, 3 Drawing Sheets

FAST TIMING ACQUISITION FOR MULTIPLE RADIO TERMINALS

BACKGROUND OF THE INVENTION

1. Field of the Invention

The present invention applies to the field of acquiring timing for radio systems having multiple terminals and, in particular, determining a frequency offset of received symbols to adjust a local oscillator.

2. Description of the Prior Art

In high capacity digital radio communication systems, timing, frequency, and phase must be accurately tracked. The more accurate the tracking, the higher the data rate can be and the lower the error rate can be. Tracking becomes more difficult when there are several radios communicating together on the same system. In a hub architecture, the hub must track each of the remotes which may each have different offsets in timing, frequency and phase. In a network of peers, all of the peers must track all of the different other peers.

Tracking can be made easier by providing all the radios with an extremely accurate reference clock, however, such clocks are expensive and still may not be synchronized. Typically, long training sequences are used at the beginning of each burst. The training sequence is made longer at the expense of transmitted data. A complex clock recovery algorithm commonly is also applied before the packet is demodulated. Tracking continues during the burst because the burst may experience an offset from the receiver clock that will affect phase and carrier frequency during the burst. This complexity requires substantial system resources and can limit system capacity.

BRIEF SUMMARY OF THE INVENTION

A method and apparatus are provided that performs timing acquisition for multiple radio terminals. According to one aspect of the present invention the invention includes receiving a sequence of symbols modulated a carrier frequency over a channel and demodulating the symbols using a clock frequency. The invention further includes determining a frequency offset of the received symbols with respect to the clock frequency and applying the determined frequency offset to adjust the clock frequency.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION OF THE INVENTION

Figure 1:
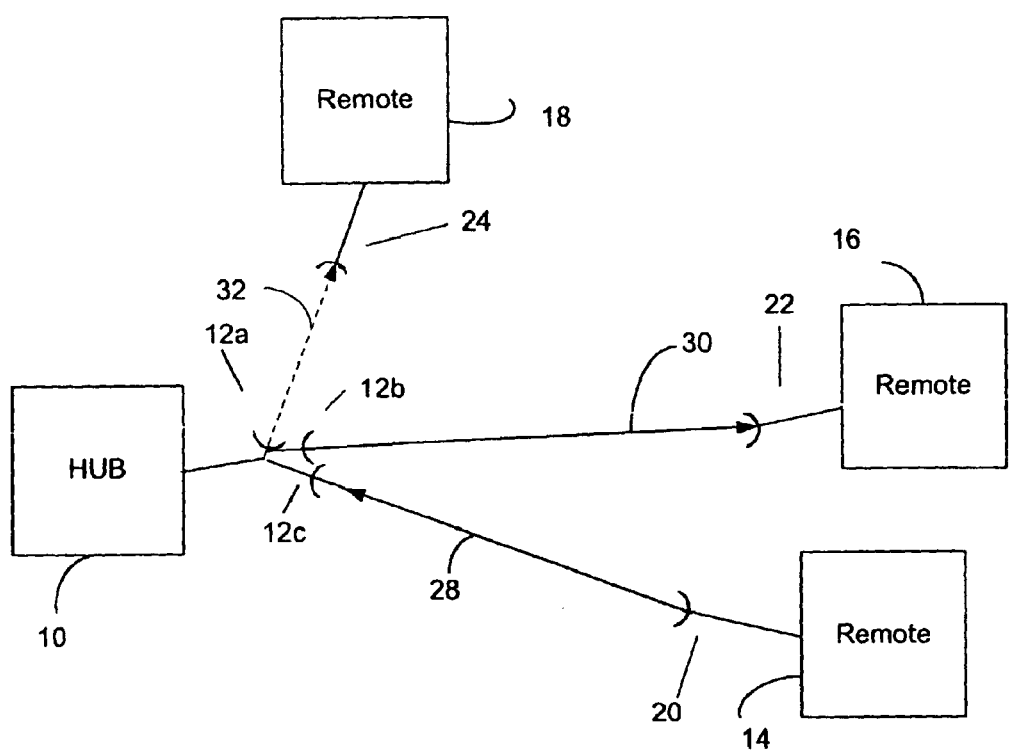
FIG. 1 is a simplified diagram of a multiple terminal radio communications system.

The present invention is particularly well suited for and will be described in the context of a point to multi-point digital radio communications system for data and voice. Such systems are useful in Ethernet or Internet networking and can also be used as wireless local loop or remote DSL (digital subscriber line) data interfaces. However, the present invention can be applied to a wide variety of other radio communications systems. In such a system, as shown in FIG. 1, a Hub 10 has a plurality of directional antennas 12a, 12b and 12c which communicate with remote terminals 14, 16 and 18 through each remote's respective directional antenna 20, 22 and 24. Alternatively, broader range antennas, including omni-directional antennas can be used. These directional antennas are typically parabolic antennas and such a system can typically support data rates on the order of tens of 10 megasymbols per second at distances from 5–10 miles. The carrier frequencies are in the GHz range and the data can be modulated with QPSK (Quarternary Phase Shift Keying), 32 QAM (Quadrature Amplitude Modulation), 64 QAM or even higher order QAM. In some embodiments the radio links are TDD (Time Division Duplex) TDMA (Time Division Multiple Access). The system can transmit data or voice and the allocation between uplink and downlink channels can be changed based on traffic demands. Typically control channels, traffic scheduling, channel access and allocations are handled in a MAC (media access channel) layer 3 and will not be discussed in detail in the present application.

In FIG. 1, the Hub is shown as communicating data through a radio channel 28 with a first remote 14 using a first antenna 12c. A second antenna 12b is being used to communicate to and from a second remote 16 over a second radio data link 30. In addition, a third remote 18 is not communicating data with the Hub 10, but is receiving a heart beat symbol from the hub 32 which is also received by the other two remotes 14 and 16. The heart beat symbol is a periodic burst with no data that is used for synchronization purposes, as is explained in more detail below.

While the radio system of FIG. 1 is shown having 4 terminals, 3 remotes and a Hub, the system can be operated with more or fewer radios and terminals. In addition, it is not required that one station be designated as a Hub and the other stations be designated as remotes. The invention can also be applied to a system in which terminals are all peers and communicate with each other. More consistent timing can be achieved if one of the terminals is designated as a master terminal for timing purposes. In the present example of FIG. 1, the Hub is designated as the timing master and the remotes are described as adapting their timing to match the master. In one embodiment, the Hub has an extremely accurate master oscillator which is used to adjust much less expensive oscillators on the remotes. In another embodiment, GPS (Global Positioning System) satellite clock signals are used as the reference clock. Since the system has a single Hub and several remotes, this allows the cost of the remotes to be reduced in comparison with the cost of the Hub.

Figure 2:
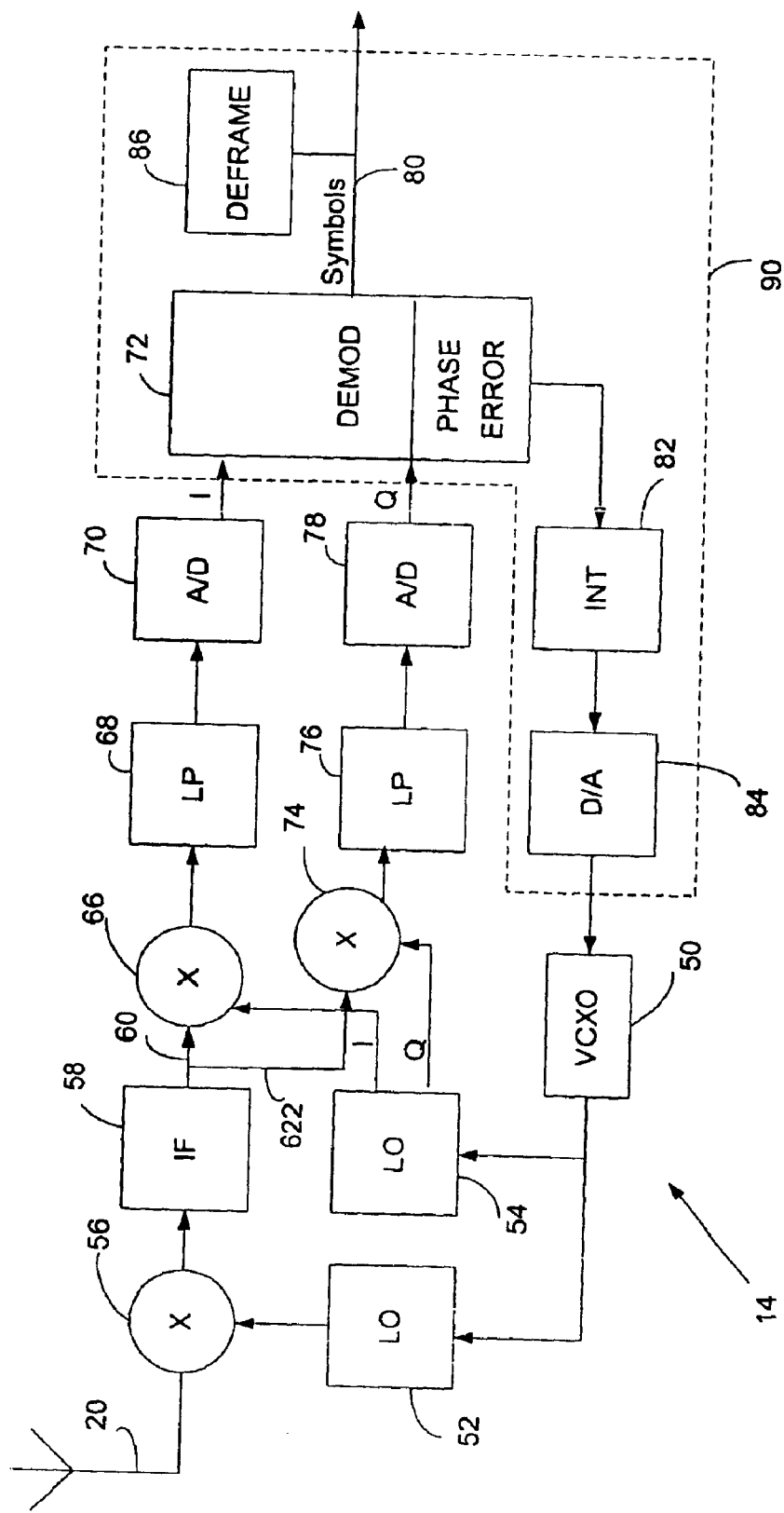
FIG. 2 is a block diagram of a portion of a terminal of FIG. 1.

FIG. 2 shows a portion of a radio terminal suitable for use with the present invention. The system of FIG. 2 corresponds to a receiver of one of the remote terminals 14, 16 and 18 of FIG. 1, for example, remote terminal 14. This terminal has an antenna 20 for receiving signals from the Hub and transmitting signals to the Hub. The terminal is timed by a voltage controlled crystal oscillator 50. However, any other accurate timing source can be used including an NCO (numerically controlled oscillator). The oscillator 50 provides a timing signal to two local oscillators 52 and 54. The first local oscillator provides a signal that is combined in a mixer 56 with the incoming signal from the antenna. The local oscillator then creates an IF (intermediate frequency) signal 58. The IF signal is divided into two paths 60 and 62.

The first path 60 is mixed with a signal from the second local oscillator at a mixer 66 and sent to a low pass filter 68.

The low pass filtered signal is forwarded to an A/D (analog-to-digital) 70 converter. This is used as the I (In-Phase) signal into a demodulator 72. The second path 62 is combined with an orthogonal phase signal from the second local oscillator 54 in another mixer 74 to form a Q (Quadrature) signal. The Q signal is low pass filtered 76 and digitized in a second A/D converter 78. The quadrature signal is also input to the demodulator 72. After demodulation, the I and Q signals received from the antenna can be converted into symbols on a symbol output line 80 which is then sent on to higher layers for further processing. The further processing can go directly into a T1 line, Ethernet or any other kind of data processing system. The remote terminal 14 can act as a node on an Ethernet network or a WAN (Wide Area Network).

The demodulator analyzes the received symbols to determine any phase rotation that may have occurred. The phase rotation is used to determine a frequency offset signal. The demodulator is also coupled to an integrator 82 which receives the phase rotation and integrates it over several symbols to create an integrator signal. In one embodiment, the integrator works continuously. The integrator signal is converted to an analog voltage in a D/A (digital-to-analog) converter 84. This analog voltage signal is supplied as the control input to the VCXO 50. Since the VCXO, the local oscillators, and the frequency offset signal make up a feedback loop, the integrator will receive error signals on either side of the accurate phase as the system iterates to zero, eventually zeroing the offset signal to within a reasonable tolerance. Absolute accuracy is not required and any improvement in frequency and phase tracking will improve the system, reducing the time and resources required to acquire a signal from the synchronized remote.

A deframer 86 listens to the output symbols from the demodulator 72 and parses headers in the symbols. This is used, as explained in more detail below, to determine the source of the symbols for application to adjusting oscillator frequency. In brief, if the received signal is received from the Hub then it can be used to adjust timing. If it is received instead from another peer or remote terminal then it is not. The source of the symbols can be determined by the deframer based on headers in the data. In one embodiment, the demodulator 72, deframer 86, integrator 82, analog to digital converter 84 and several other components (not shown) are incorporated within an FPGA (Field Programmable Gate Array) or ASIC (Application Specific Integrated Circuit), in order to reduce cost and enhance the speed of the system.

The hardware architecture shown and described with respect to FIG. 2 is provided as an example of a possible radio terminal design suitable for implementing the present invention. However, a variety of other radio architectures can be used as is well-known in the art. In one example system, the carrier frequency is approximately 1 GHz and the symbol rate is 10 MHz so that a reference oscillator can be used that produces an oscillation standard of 1 MHz. In such a case, the clocks of the remote terminals will typically be off by 10–15 ppm. This deviation will be on the order of a 10–15 KHz which can seriously impact the ability of symbols to be received using a 1 GHz carrier. In order to reduce this problem, the remote terminals, according to the present invention, are able to lock onto the Hub's frequency offset and compensate their own remote transmit frequency for this offset both in the carrier frequency and in the symbol rate.

The master clock 50 of the remote terminal is adjusted to lock in with the Hub's corresponding transmit carrier frequency because the carrier frequency is significantly higher than the symbol rate. Locking onto the Hub's carrier frequency provides much greater accuracy than using the symbol rate for timing acquisition. In one embodiment, the Hub transmits a heart beat signal whenever it is not transmitting data to which the remotes can listen to acquire timing. The heart beat signal is a periodic burst that carries no data modulated onto the carrier frequency. This allows the remote terminals to constantly update their own frequency offset. Using this constant adjustment process, a much simpler and lower accuracy master oscillator 50 can be used in the remote terminal than otherwise would be necessary.

Once the remote has synchronized its clock to that of the hub, it can apply the same clock, or a synchronized clock, to its transmitter. The transmitted bursts can be more quickly, and accurately received using a less expensive receiver. The remote transmitter (not shown) resembles the receiver shown in FIG. 2 and typically uses a diplexer switch to allow it to receive and transmit from the same antenna. Typically, a modulator receives the transmit data and converts it into I and Q components of corresponding symbols. The symbols are converted to analog waveforms, which are upconverted to an intermediate frequency and then modulated onto the carrier waveform for transmission through the antenna 20. The frequency references for the converters and the carrier waveform are all based on the corrected frequency of the VCXO 50, so that the burst is coordinated with the Hub's timing. The specific construction of the transmitter is not important, nor is the particular construction of the receiver and the constructions shown and described are intended only as examples.

At the Hub, the receiver and transmitter can be very similar to that described for the remote. Since the Hub does not correct for remote timing, it will not use the integrator 82 and D/A converter 84 to adjust its main clock 50. As with the remotes, the same clock or a synchronized clock is used to receive and to transmit. As mentioned above, this clock will be selected to be inherently stable to within the design constraints. Alternatively, it can be based on some external clock source. Because the remotes are automatically compensating for drifts and changes in the Hub's clock, the Hub's clock does not need to be as accurate as might otherwise be the case.

Figure 3:
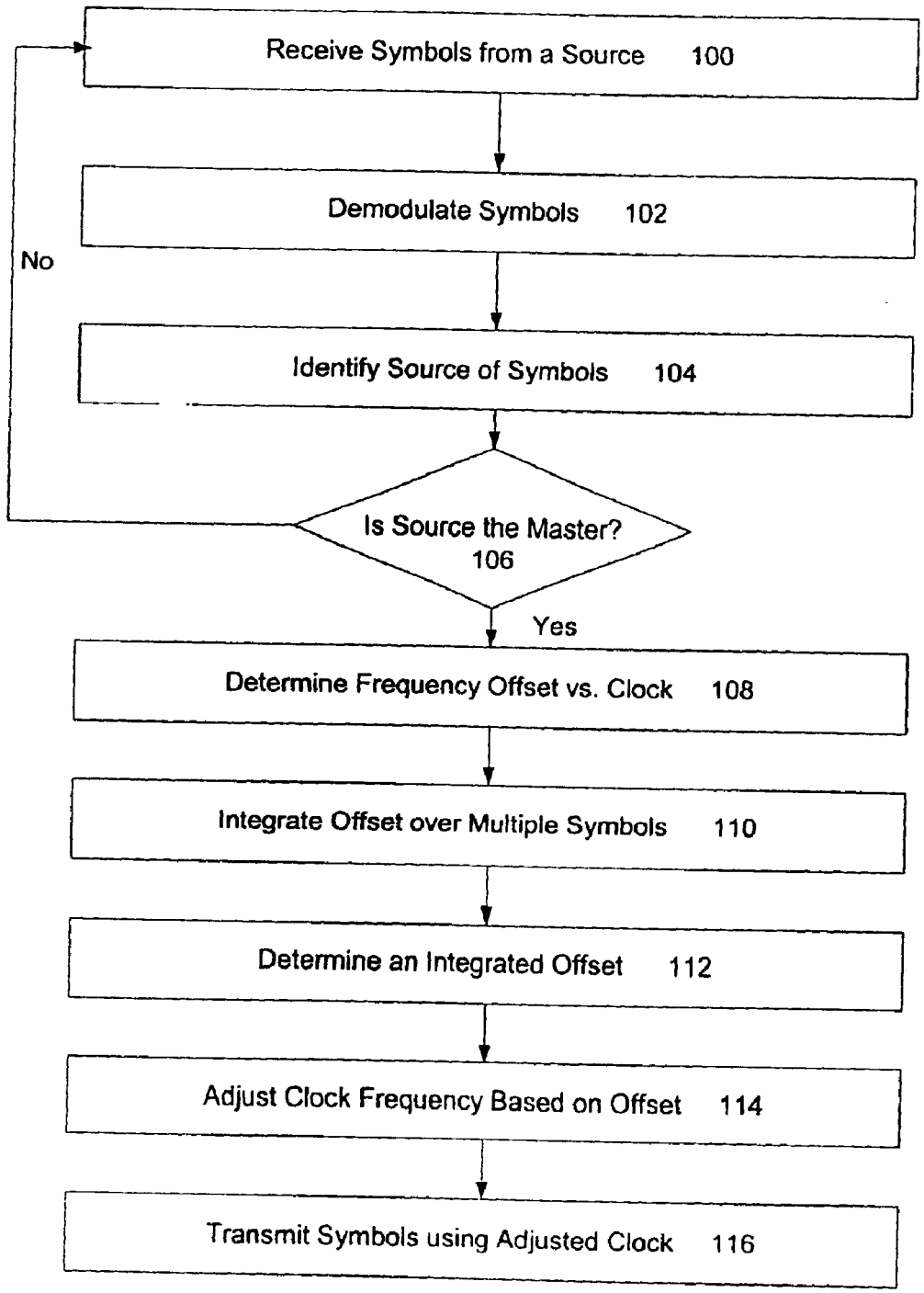
FIG. 3 is a flow chart of a process for acquiring timing at a radio terminal such as the one illustrated in FIG. 2.

Referring to FIG. 3, a terminal acquires timing first by receiving symbols from the timing master. In the present example, the timing master is the Hub 10. The received symbols have been modulated onto a carrier frequency which, when received is down converted and separated into I and Q components as discussed with respect to FIG. 2. The system then demodulates the symbols 102. As discussed above, with respect to FIG. 2, there is an ASIC that receives the I and Q signals from the Hub and demodulates them in a demodulator 72.

The demodulated symbols are then screened to identify the source of the symbols 104 in a deframer 86. This is done in order to make sure that the remotes lock only onto the Hub's timing and not onto the timing of other remotes. In one embodiment, all of the Hub's transmissions have a header which distinguishes the Hub from a remote. The particular configuration and format of the headers and the packets can be varied to suit the demands of the particular application. If the received symbols come from another remote then the deframer does not permit that frequency offset signal to be applied to the long term integrator 82. On the other hand, if the symbols did come from the Hub 10 then an error frequency offset is calculated and applied into the long term integrator.

Accordingly as shown in FIG. 3, the deframer determines if the source of the symbols is the timing master 106. If not, the process returns to the beginning. If it is, a frequency offset is determined. After the frequency offset has been determined, it is integrated over multiple symbols 110 in the long term integrator 82 and an integrated offset is determined 112. The integrated offset is applied to adjust the clock frequency based on the offset 114.

As shown in FIG. 2, one way of adjusting the clock is to convert the integrated offset to an analog voltage and a digital to analog converter 84 and apply that as a control signal to a voltage controlled oscillator 50. The circuitry necessary to adjust and modify the parameters of the control voltage can be easily established by a person of average skill in the art. Once the clock is adjusted, the adjusted clock frequency can be used both to receive and transmit symbols 116.

As can be understood from the description above, in the example of a hub system, all of the remotes will be locked to the clock and carrier references received from the hub. This allows all of the remote transmitters to use the same reference. It also makes the burst demodulation of packets from different remotes at the hub simpler, since all of the remotes are synchronized. The hub does not need to distinguish between different remotes except to compensate for propagation delays. In effect, all of the incoming bursts from remotes will have the same clock and carrier frequencies as the hub.

In the described embodiment, the remotes measure the difference in the frequencies for the clock and the carrier between their own internal references and the incoming signals received from the hub. The remotes then adjust their internal references until the error is zero, or at least within a design threshold of zero. The transmit and receive references at the remotes are now essentially the same as on the master. This ensures that the frequency references for the data packets that the hub receives from different remotes are at the same frequency. As a result, the demodulation process at the hub is simpler and faster.

In one embodiment, for clock recovery, only an initial phase measurement needs to be done. This is primarily due to variations in propagation delay not in the clocks. Tracking within the packet may not be needed since the received data has the same frequency as the hub clock reference. The short term drift that occurs within a packet is normally negligible. The training sequences for initial recovery can also be shorter since only the initial phase measurement is needed. For carrier recovery, frequency offset is largely eliminated, making carrier tracking easier. Typically, only instantaneous phase error tracking needs to be done. In addition, the initial precision of the reference oscillators can be reduced since the system can automatically compensate for initial offsets.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, any steps described as being performed by the base station may be performed by the user terminal and vice versa. The invention is equally applicable to systems in which terminals communicate with each other without either one being designated as a base station, a user terminal, a remote terminal or a subscriber station. The invention can further be applied to a network of peers.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless point to multi-point data system for fixed radio terminals, it can be applied to a wide variety of different wireless systems in which timing is important. Such systems include voice, video, music, broadcast and other types of data systems without external connections. The present invention can be applied to fixed remote terminals as well as to low and high mobility terminals. Many of the methods are described in their most basic form but steps can be added to or deleted from any of the methods and information can be added or subtracted from any of the described messages without departing from the basic scope of the present invention.

It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   receiving a sequence of symbols modulated onto a carrier frequency over a channel;
   demodulating the symbols using a clock frequency;
   determining a frequency offset of the received symbols with respect to the clock frequency;
   integrating the frequency offset over a predetermined number of symbols to create an integrator signal; and
   applying the integrator signal to adjust the clock frequency.

2. The method of claim 1 wherein the predetermined number of symbols is sufficient to compensate for short term variations in the clock frequency.

3. The method of claim 1, further comprising analyzing the received symbols for a sequence that identifies a source of the sequence and enabling or disabling the application of the frequency offset to adjust the clock frequency based on the source of the symbols.

4. The method of claim 1 wherein applying the integrator signal comprises applying a voltage to a voltage controlled oscillator.

5. The method of claim 1 wherein determining a frequency offset comprises determining a frequency offset with respect to the carrier frequency.

6. The method of claim 1 wherein the sequence of symbols is modulated onto the carrier frequency using phase shift keying and wherein determining a frequency offset comprises determining a phase rotation of the phase shift keyed symbols.

7. The method of claim 1 further comprising applying the adjusted clock frequency to transmit a sequence of symbols modulated on a carrier frequency.

8. The method of claim 7 wherein the adjusted clock frequency is applied to the transmission rate of the symbol sequence and to the carrier frequency.

9. The method of claim 1 wherein the adjusted clock frequency is a master clock frequency for a terminal.

10. An apparatus comprising:
- a receiver to receive a sequence of symbols modulated on a carrier frequency;
- an adjustable clock to generate a clock frequency for use in receiving and transmitting;
- a demodulator to demodulate the received symbols and to determine a frequency offset of the received symbols with respect to the clock frequency; and
- an adjustment drive circuit to receive the frequency offset and generate a clock adjustment signal for application to the adjustable clock, the adjustment drive circuit including a short term integrator to integrate the frequency offset over a predetermined number of symbols.

11. The apparatus of claim 10 wherein the predetermined number of symbols is sufficient to compensate for short term variations in the clock frequency.

12. The apparatus of claim 10 further comprising a deframer to analyze the received symbols for a sequence that identifies a source of the sequence and a switch coupled to the deframer to enable or disable the application of a frequency offset to adjust the clock frequency based on the source of the symbols.

13. The apparatus of claim 10 wherein the adjustable clock comprises a voltage controlled oscillator and wherein the adjustment drive circuit comprises a digital to analog converter to generate an adjustment voltage to apply to the voltage controlled oscillator.

14. The apparatus of claim 10 wherein the frequency offset comprises a frequency offset with respect to the carrier frequency.

15. The apparatus of claim 10 wherein the received symbols are modulated onto the carrier frequency using phase shift keying and wherein the frequency offset comprises a phase rotation of the phase shift keyed symbols.

16. The apparatus of claim 10 further comprising a modulator to modulate a sequence of symbols on a carrier frequency using the adjusted clock frequency.

17. The apparatus of claim 16 wherein the adjusted clock frequency is applied to the transmission rate of the symbol sequence and to the carrier frequency.

18. The apparatus of claim 10 wherein the adjustable clock comprises a master clock for the apparatus.

19. A machine-readable medium having stored thereon data representing instructions which, when executed by a machine, cause the machine to perform operations comprising:
- receiving a sequence of symbols modulated onto a carrier frequency over a channel;
- demodulating the symbols using a clock frequency;
- determining a frequency offset of the received symbols with respect to the clock frequency;
- integrating the frequency offset over a predetermined number of symbols to create an integrator signal; and
- applying the integrator signal to adjust the clock frequency.

20. The medium of claim 19 wherein the predetermined number of symbols is sufficient to compensate for short term variations in the clock frequency.

* * * * *